United States Patent
Chen et al.

(10) Patent No.: US 10,360,496 B2
(45) Date of Patent: Jul. 23, 2019

(54) APPARATUS AND METHOD FOR A DIGITAL NEUROMORPHIC PROCESSOR

(71) Applicants: Gregory K. Chen, Hillsboro, OR (US);
Jae-Sun Seo, Tempe, AZ (US);
Thomas C Chen, Ann Arbor, MI (US);
Raghavan Kumar, Hillsboro, OR (US)

(72) Inventors: Gregory K. Chen, Hillsboro, OR (US);
Jae-Sun Seo, Tempe, AZ (US);
Thomas C Chen, Ann Arbor, MI (US);
Raghavan Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 590 days.

(21) Appl. No.: 15/088,543

(22) Filed: Apr. 1, 2016

(65) Prior Publication Data
US 2017/0286827 A1    Oct. 5, 2017

(51) Int. Cl.
*G06N 3/063*   (2006.01)
*G06N 3/04*    (2006.01)

(52) U.S. Cl.
CPC ............. *G06N 3/063* (2013.01); *G06N 3/049* (2013.01)

(58) Field of Classification Search
CPC ....................................................... G06N 3/04
See application file for complete search history.

(56) References Cited

U.S. PATENT DOCUMENTS 8,856,055 B2    10/2014  Brezzo et al.
10,049,322 B2 *  8/2018  Ross ................... G06F 15/8046
(Continued)

OTHER PUBLICATIONS

International Search Report and Written Opinion for Application No. PCT/US2017/021084, dated May 24, 2017, 14 pages.

(Continued)

*Primary Examiner* — Eric Nilsson
*Assistant Examiner* — Brent Johnston Hoover
(74) *Attorney, Agent, or Firm* — Nicholson DeVos Webster & Elliot LLP

(57) ABSTRACT

An apparatus and method are described for a neuromorphic processor design in which neuron timing information is duplicated on a neuromorphic core. For example, one embodiment of an apparatus comprises: a first neurosynaptic core comprising a plurality of neurons and a synapse array comprising a plurality of synapses to communicatively couple the plurality of neurons, each synapse connecting two neurons having a weight associated therewith, wherein a first neuron is to generate an output spike based on the weights of synapses over which inputs are received from the other neurons; a second neurosynaptic core also comprising a plurality of neurons and having at least one counter to maintain a count value indicative of spike timing for a second neuron, wherein a spike output of the second neuron in the second neurosynaptic core is communicatively coupled over a first synapse to the first neuron in the first neurosynaptic core; and a duplicate counter maintained within the first neurosynaptic core and synchronized with the counter from the second neurosynaptic core, the first neuron to use a first value from the duplicate counter to adjust the weight of the first synapse coupling the second neuron to the first neuron.

22 Claims, 10 Drawing Sheets

(56) References Cited

U.S. PATENT DOCUMENTS

| | | | |
|---|---|---|---|
| 2012/0036099 A1* | 2/2012 | Venkatraman | G06N 3/049 706/27 |
| 2014/0032464 A1 | 1/2014 | Esser et al. | |
| 2014/0032465 A1* | 1/2014 | Modha | G06N 3/04 706/27 |
| 2014/0351186 A1* | 11/2014 | Julian | G06N 3/08 706/20 |
| 2015/0324684 A1* | 11/2015 | Alvarez-Icaza Rivera | G06N 3/04 706/26 |
| 2015/0347897 A1 | 12/2015 | Modha et al. | |
| 2015/0379396 A1 | 12/2015 | Arthur et al. | |

OTHER PUBLICATIONS

International Preliminary Report on Patentability for Application No. PCT/US2017/021084, dated Oct. 2, 2018, 10 pages.

* cited by examiner

APPARATUS AND METHOD FOR A DIGITAL NEUROMORPHIC PROCESSOR

BACKGROUND

Field of the Invention

This invention relates generally to the field of computer processors. More particularly, the invention relates to a method and apparatus for a digital neuromorphic processor.

Description of the Related Art

In machine learning and cognitive science, artificial neural networks (ANNs) are a family of models inspired by biological neural networks (the central nervous systems of animals, in particular the brain) and are used to estimate or approximate functions that can depend on a large number of inputs and are generally unknown.

Computational devices have been created in CMOS for neuromorphic computing. One particular form of neuromorphic computing, spiking neural networks (SNNs), increases the level of realism in a neural simulation. In addition to neuronal and synaptic state, SNNs also incorporate the concept of time into their processing model. The idea is that neurons in the SNN do not fire at each propagation cycle, but rather fire only when a membrane potential—an intrinsic quality of the neuron related to its membrane electrical charge—reaches a specific threshold value. When a neuron fires, it generates a signal which travels to other neurons which, in turn, increase or decrease their potentials in accordance with this signal.

For spiking neural networks, each neuron has large fan-in and fan-out connections, and the connections should be sparse and programmable. To perform online learning such as spike timing dependent plasticity (STDP) in hardware, keeping track of the spike timing and spike rate in many different neurons creates challenges for computation, memory, and communication.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
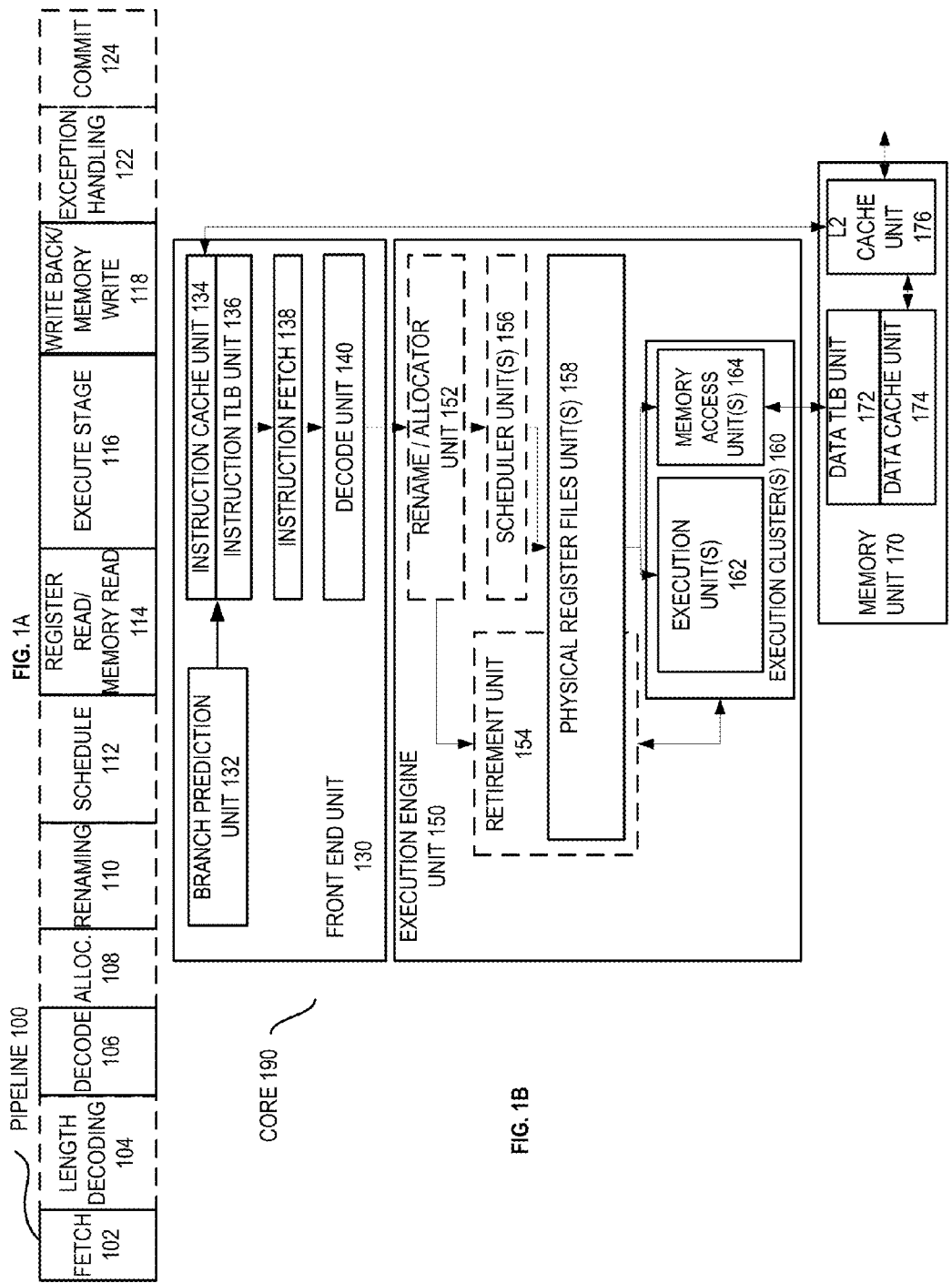
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
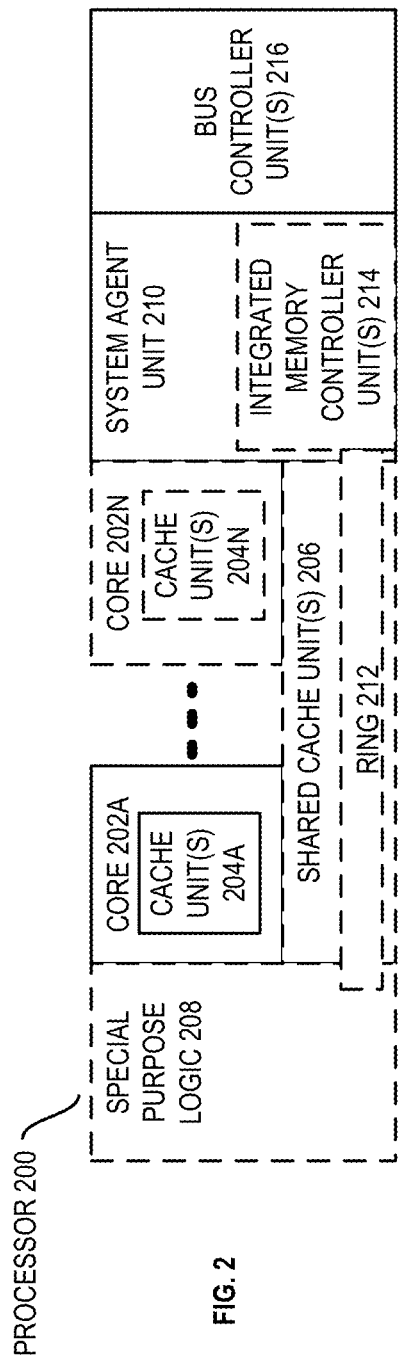
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
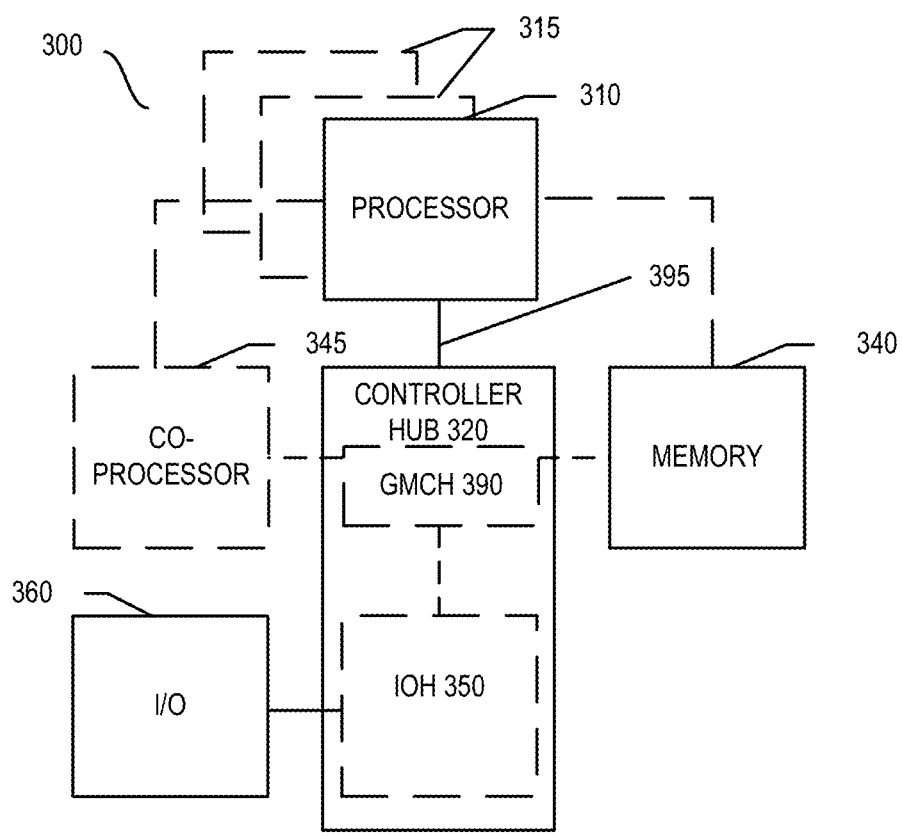
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
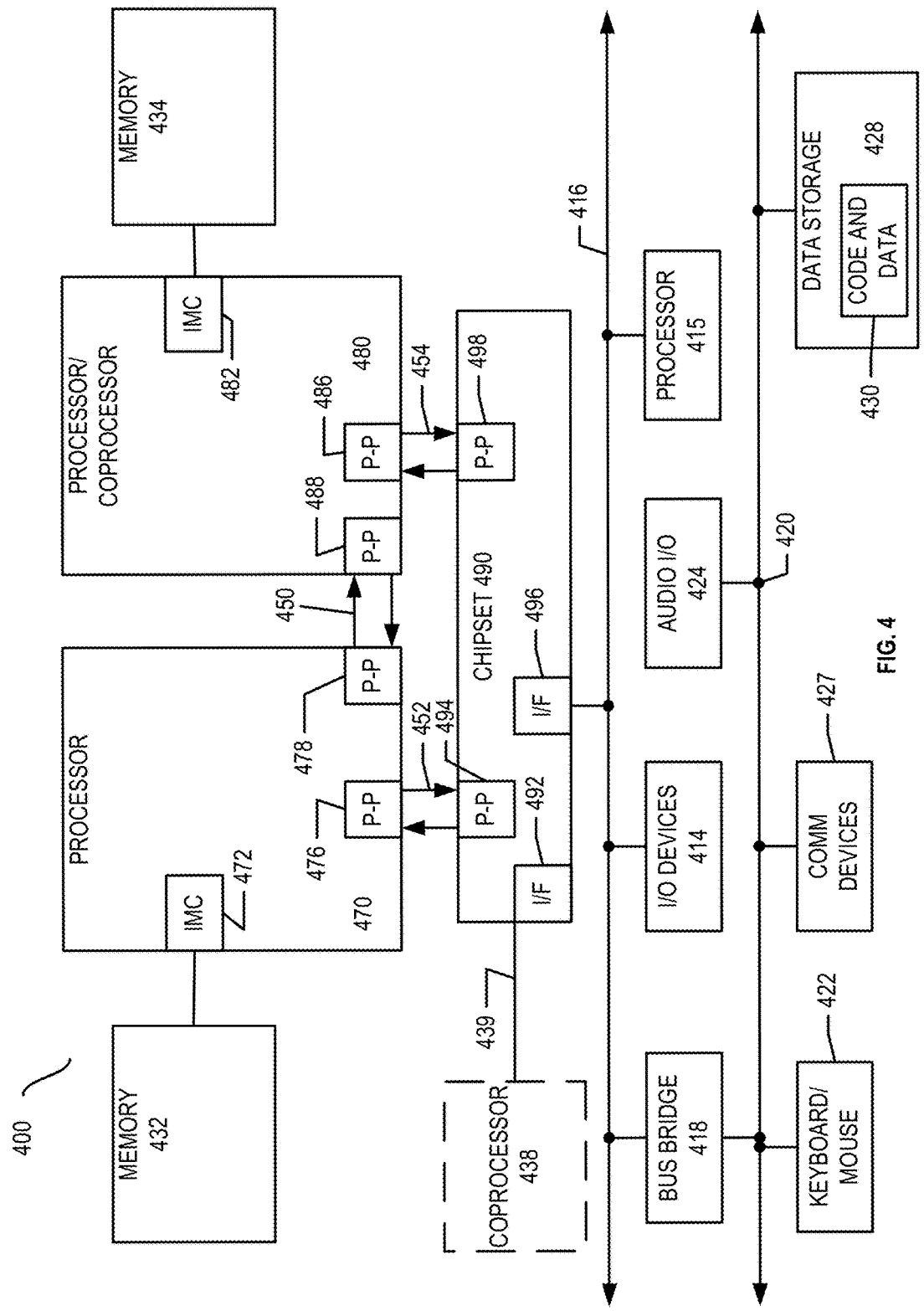
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488.

Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
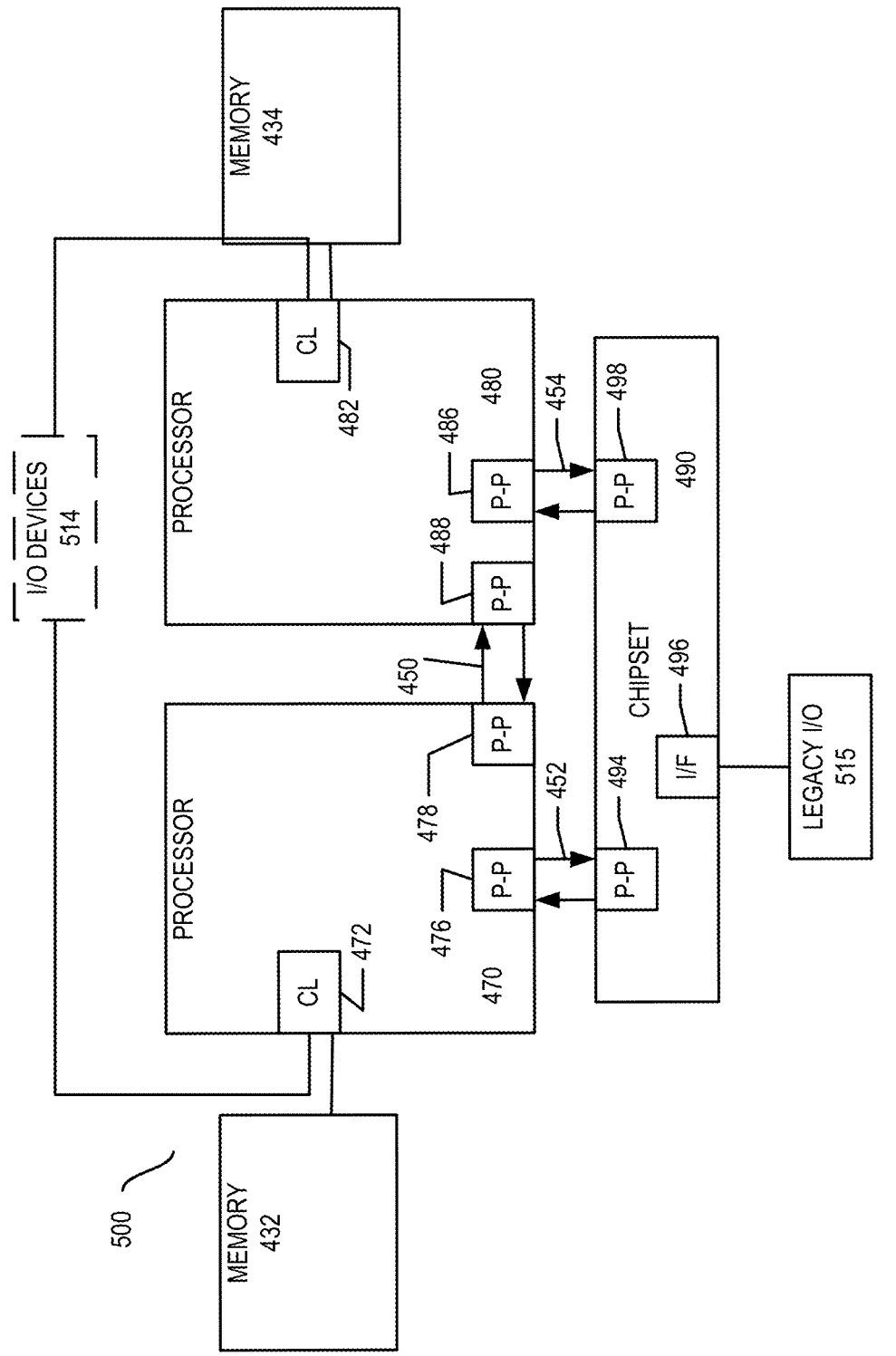
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
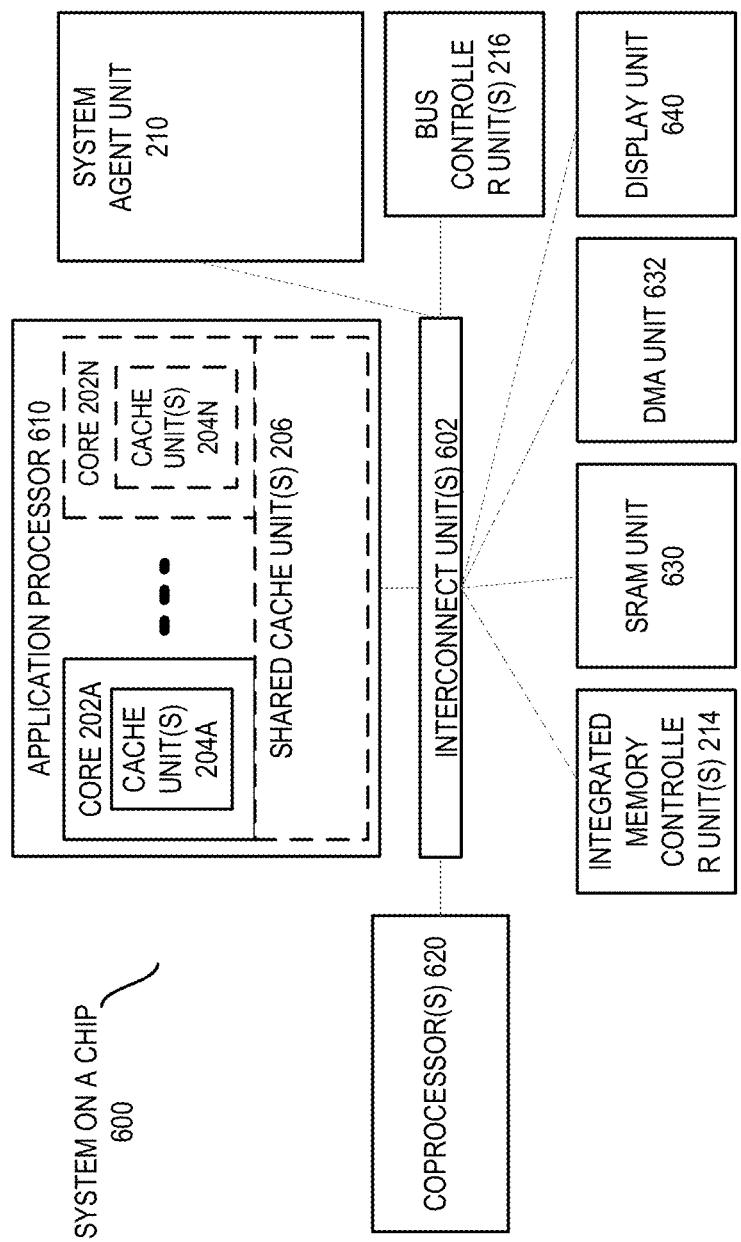
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
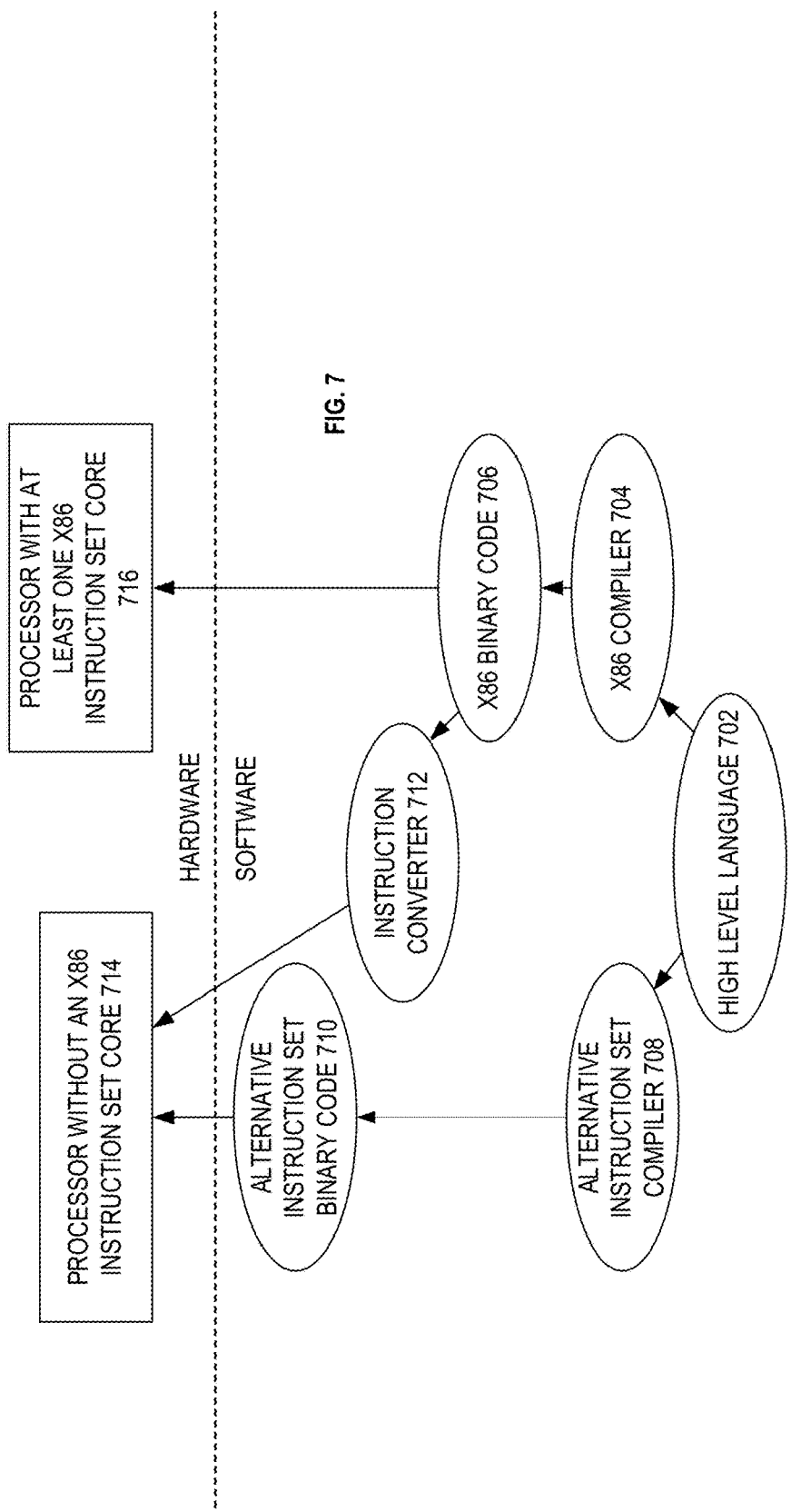
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for a Digital Neuromorphic Processor

As mentioned, one embodiment of the invention comprises a neuromorphic processor comprising a plurality of interconnected neurosynaptic cores. Within each neurosynaptic core, a group of local neurons are interconnected with a fan-in synaptic memory. In one embodiment, to reduce the amount of inter-core data traffic, pre-synaptic neuron timing information (e.g., counter values) are duplicated in the receiving neurosynaptic cores.

Figure 8:
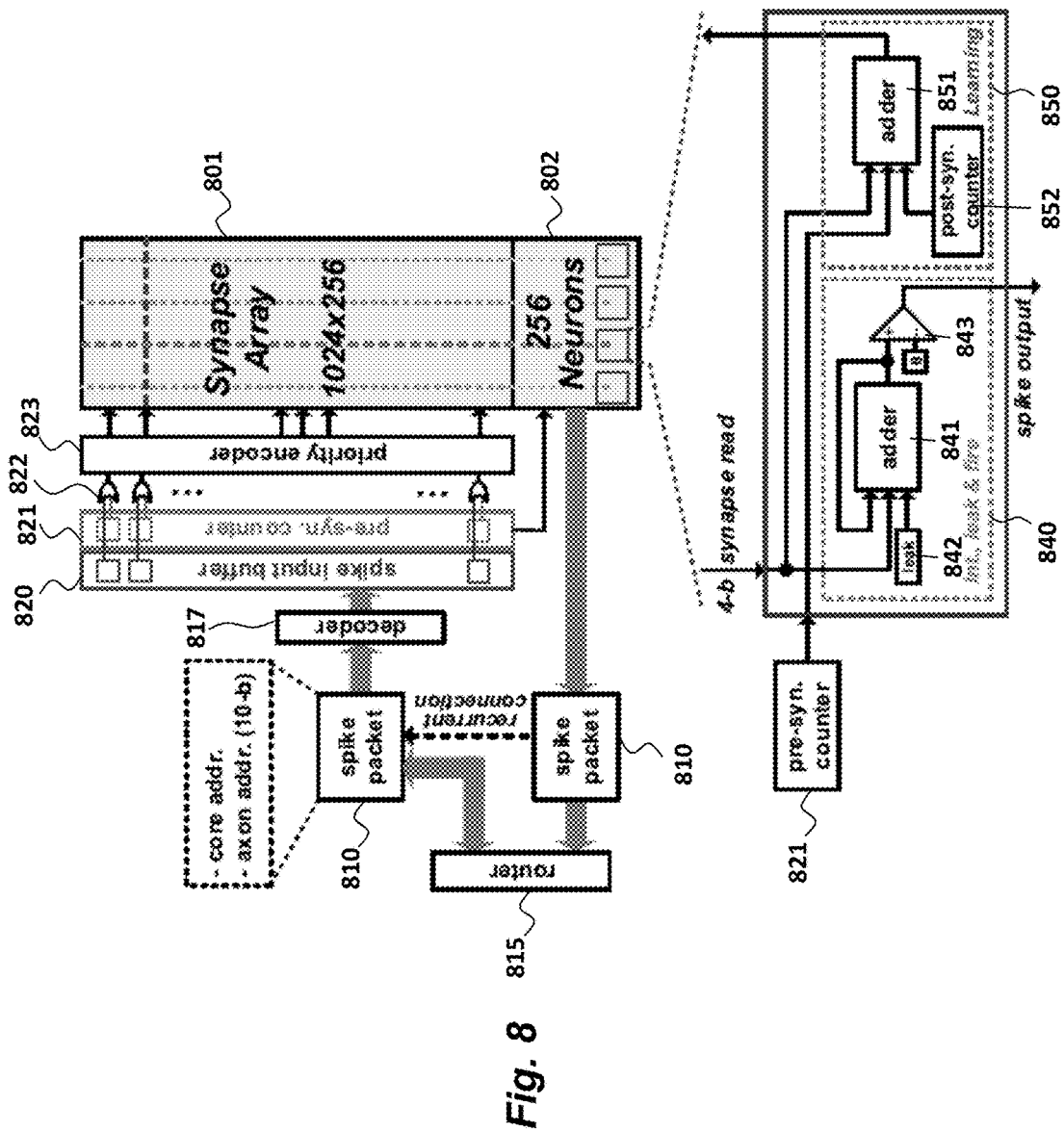
FIG. 8 illustrates an exemplary neuromorphic processor design comprising a plurality of neurons connected via a synapse array.

FIG. 8 illustrates an exemplary neurosynaptic core comprising 256 neurons 802 interconnected via a 1024×256 synapse array 801. In one embodiment, each neuron in neuron group 802 receives a large number of inputs from the synapse array 801 each of which provides a weighted value. In spiking neural networks, each neuron adds its inputs (or performs some other mathematical function) to arrive at a value and then determines whether that value has reached a particular threshold. If so, its output "spikes" resulting in a spike packet 810 which is then routed to one or more other neuromorphic cores through a router 815 and/or supplied back to a local decoder 817 in case of a recursively connected neuron group 802 (i.e., local to the neuron's neuromorphic core) which decodes the spike packet and stores the results in a spike input buffer 820.

In one embodiment, the synapse array 801 comprises memory cells that have a value or weight associated with each neuron-to-neuron connection (e.g., with larger weights indicating a stronger connection). The connections may be directed or undirected. In FIG. 8, the synapse array is 1024×256, providing 1024 inputs to each of the 256 neurons 802. The number of bits per synapse can vary depending on the implementation and may range, for example, between 1 bit and 32 bits. In the illustrated example, each synapse includes 4 bits which encode the weighted value. However, the underlying principles of the invention are not limited to any particular number of bits per synapse.

In the embodiment in FIG. 8, each neuron includes an integration, leak & fire circuit 840 which reads the weighted value from each synapse. An adder 841 integrates inputs onto the neuron's membrane potential by adding weighted inputs to the membrane potential value from the previous timestep. A leak unit 842 leaks off (i.e., subtracts) a certain amount (such as a fixed amount or amount proportional to the membrane potential) of potential each timestep so that information decays over time. A comparator 843 generates a spike output if the membrane potential is larger than a threshold value.

In a spiking neural network which performs on-chip learning using spike timing dependent plasticity (STDP), the synaptic weight changes with time as a function of the relative spike times of presynaptic and post-synaptic neurons. In this illustrated embodiment, the spike times are captured using a pre-synaptic counter value 821 and a post synaptic counter value 852. In particular, the weight of a synapse is increased if its post-synaptic neuron fires after its pre-synaptic neuron fires, and decreased if the firing order is reversed. In one embodiment, a learning unit 850 implements these learning operations to generate new weighted values for the synapses. In particular, an adder 851 combines results from a pre-synaptic counter 821, a post synaptic counter 852 and a current synapse read, to calculate the current weighted value for the synapse. Different weights may be used for different implementations. For example, in some embodiments, negative weights may be used while only positive or zero weights may be used in other embodiments.

As illustrated in FIG. 8, incoming spike packets 810 are decoded by decoder 817 to generate one or more spike inputs stored within a spike input buffer. In one embodiment, a 1 within the spike input buffer represents a spike input and a 0 represents a non-spike input. A priority encoder 823 activates each row within the synapse array 801 for which a spike input is stored within the spike input buffer 820, generating new inputs to the neurons (one example indicated by the dotted line in FIG. 8), which then integrate the new input values as described above (e.g., via integration, leak, and fire unit 840 to generate new spike outputs). The priority encoder 823 also activates if duplicated pre-synatic counter values 821 are active. Counter values 821 are compared with post-synatic counter values 852 to perform synaptic learning using LTD. The priority encoder 823 may perform integration and learning concurrently using pipelining.

Figure 9:
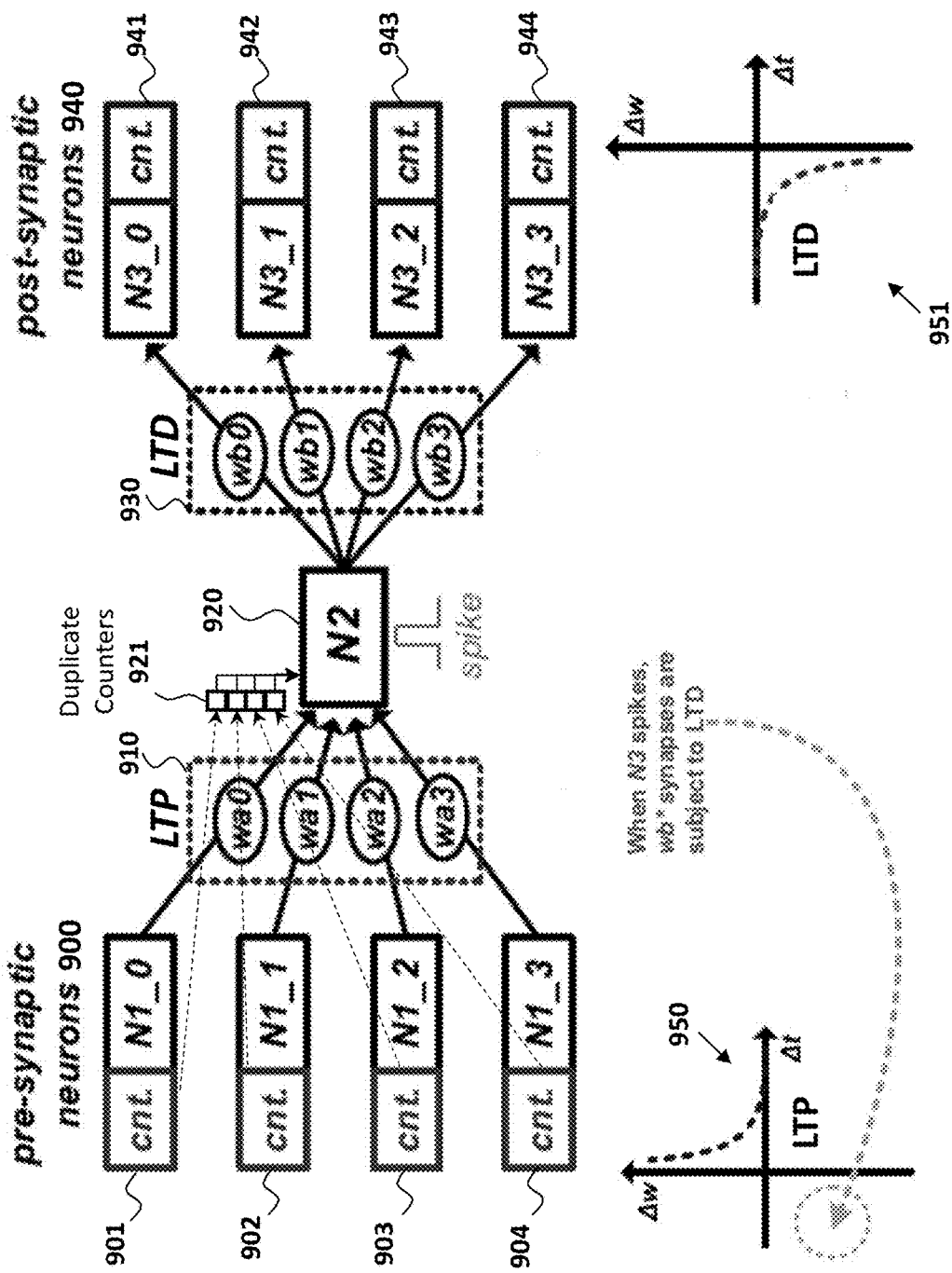
FIG. 9 illustrates an exemplary set of neurons on which long term potentiation (LTP) and long term depreciation (LTD) operation are performed.

FIG. 9 illustrates additional details associated with performing LTP and LTD operations to increase and decrease the weight of synaptic connections, respectively. The description of FIG. 9 will be provided relative to neuron N2 920. Thus, neurons N1_0 to N1_3 900 are "pre-synaptic" neurons and neurons N3_0 to N3_3 940, are "post-synaptic" neurons. As illustrated a pre-synaptic counter value 901-904 is associated with each of the pre-synaptic neurons and a post-synaptic counter value 941-944 is associated with each of the post-synaptic neurons. A neuron may set its counter value to a specified value upon spiking and then count down from that value on each timestep (e.g., reduce the initial value by 1 on each timestep until reaching a 0 value). The counter value may then be used to determine how long it has been since the neuron spiked.

In one embodiment, current weights wa0-wa3 910 are associated with the synapses connecting the pre-synaptic neurons N1_0 to N1_3 900 to neuron N2. Upon spiking, each of the pre-synaptic neurons N1_0 to N1_3 900 provide their counter values 901-904 to N2. As mentioned, in order to reduce data traffic between N2 and N1, the neurosynaptic core in which neuron N2 resides maintains a duplicate counter 921 to track each of the counter values 901-904 over time. Thus, when N2 spikes, it can readily check these local counters 921 to determine the extent to which LTP should potentiate each of the respective weights wa0-wa3 910. For example, as indicated by graph 950 shown in FIG. 9, the change in potentiation (dw) increases when the difference between the pre-synaptic counter value and the post synaptic counter value ($\Delta t$) is small, and then falls off exponentially as $\Delta t$ increases.

Conversely, when the post-synaptic counter value is less than the pre-synaptic counter value, resulting in a negative dt, this indicates that the post synaptic neuron spiked prior to the pre-synaptic neuron (indicating that the post-synaptic neuron did not spike as a result of the pre-synaptic neuron firing). When neuron N2 spikes, LTD computations are performed on synapses 930 using spike history counters 941-944. The spike history counter for N2 920 is duplicated in the cores of post-synaptic neurons 940. When neurons 940 receive the spike from N2, they perform LTD by comparing their spike history counter value 941-944 to the duplicated spike history counter of N2 920. In one embodiment, the depreciation of the weight is applied in accordance with graph 951. As shown, if the post-synaptic counter is just slightly less than the pre-synaptic counter (resulting in a small negative value dt), then the weight of the synaptic connection will be decreased by a significant amount (i.e., a large negative dw value). As the difference between the counter values increases, then the depreciation value falls off exponentially as dt decreases from 0.

In one embodiment, the LTP and LTD operations described with respect to FIG. 8 are performed by the learning circuit 850 which receives the pre-synaptic counter 821 and post-synaptic counter 852 values as input. Because one embodiment of the invention duplicates the pre-synaptic counter 821 directly on the neurosynaptic core, there is no need for the learning circuit 850 to request this value off-core, thereby significantly reducing inter-core traffic.

Figure 10:
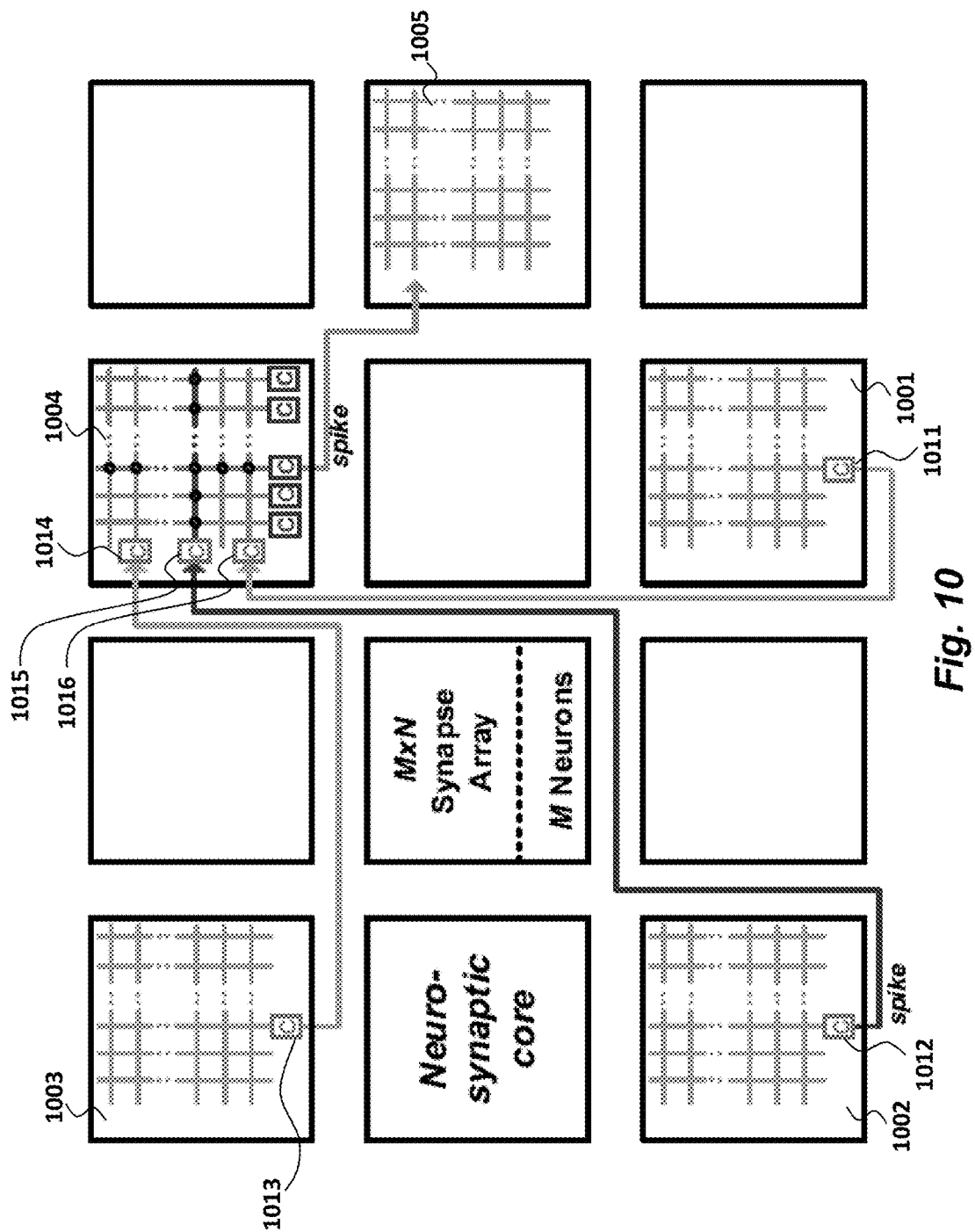
FIG. 10 illustrates one embodiment of the invention which duplicates pre-synaptic neuron timing values in a receiving neurosynaptic core.

FIG. 10 illustrates one embodiment in which a plurality of pre-synaptic counters 1011-1013 of neurosynaptic cores 1001-1003 are represented by duplicate counters 1014-1016 within a post-synaptic core 1004. In this particular example, neurosynaptic core 1002 has spiked. As a result, the value of its counter 1012 is duplicated as counter 1015 at the post-synaptic core 1004. Because each of the neuro-synaptic cores operate using the same timestep, each of the counters 1012 and 1015 will be decremented at the same points in time (or incremented, depending on the spike timing is tracked). Consequently, when neurosynaptic core 1004 spikes (as indicated by the arrow connected to neurosynaptic core 1005), it can read the local counter value 1015 to perform LTP (i.e., comparing its own spike counter value with that stored in counter 1015). Similarly when pre-synaptic neurons 1001-1003 spike, LTD can be performed in core 1004 by comparing local counter values 1014-1016 with the post-synaptic spike history counter in 1004.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a first neurosynaptic core comprising a plurality of neurons and a synapse array comprising a plurality of synapses to communicatively couple the plurality of neurons, each synapse connecting two neurons having a weight associated therewith, wherein a first neuron is to spike its output based on the weights of synapses over which inputs are received from the other neurons;
a second neurosynaptic core also comprising a plurality of neurons and having at least one counter to maintain a count value indicative of spike timing for a second neuron, wherein a spike output of the second neuron in the second neurosynaptic core is communicatively coupled over a first synapse to the first neuron in the first neurosynaptic core; and
a duplicate counter maintained within the first neurosynaptic core and synchronized with the counter from the second neurosynaptic core, the first neuron to use a first value from the duplicate counter to adjust the weight of the first synapse coupling the second neuron to the first neuron, wherein to adjust the weight of the first synapse, the first neuron is to compare the first value from the duplicate counter with a second value in a second counter of the first neuron, the second value indicative of spike timing of the first neuron.

2. The apparatus as in claim 1 wherein if the comparison of the first and second values indicates that the first neuron spiked its output after the second neuron spiked its output, then the first neuron is to increase the weight of the first synapse based on a difference between the first and second values.

3. The apparatus as in claim 2 wherein if the comparison of the first and second values indicates that the first neuron spiked its output before the second neuron spiked its output, then the first neuron is to decrease the weight of the first synapse based a difference between the first and second values.

4. The apparatus as in claim 3 wherein increasing or decreasing the weight comprises writing a new weight value to a memory location corresponding to the first synapse.

5. The apparatus as in claim 1 wherein the second neurosynaptic core is to transmit a spike packet to the first neurosynaptic core, wherein upon receipt of the spike packet, behavior of the duplicate counter in the first neurosynaptic core and the counter in the second neurosynaptic core is enforced to be identical.

6. The apparatus as in claim 5 further comprising:
a decoder to decode the spike packet to generate results stored within a spike input buffer.

7. The apparatus as in claim 6 wherein outputs from the spike input buffer are communicatively coupled to select one or more rows within the synapse array.

8. The apparatus as in claim 1 wherein each neuron comprises a first circuit to determine whether to spike its output based on weights read from its synapses, the first circuit including an adder to add weights and a comparator to compare the combined weights with a threshold value.

9. The apparatus as in claim 8 further comprising:
a leak circuit to subtract a specified amount from current combined weights on each timestep.

10. The apparatus as in claim 9 further comprising:
a second circuit to perform learning operations to adjust the weight of the first synapses and one or more other synapses.

11. A system comprising:
a memory to store program code and data;
a central processing unit (CPU) to execute the program code and process the data;
a spiking neural network comprising a plurality of neurosynaptic cores to perform on-chip learning operations responsive to control signals provided from the CPU, the spiking neural network comprising:
a first neurosynaptic core comprising a plurality of neurons and a synapse array comprising a plurality of synapses to communicatively couple the plurality of neurons, each synapse connecting two neurons having a weight associated therewith, wherein a first neuron is to spike its output based on the weights of synapses over which inputs are received from the other neurons;
a second neurosynaptic core also comprising a plurality of neurons and having at least one counter to maintain a count value indicative of spike timing for a second neuron, wherein a spike output of the second neuron in the second neurosynaptic core is communicatively coupled over a first synapse to the first neuron in the first neurosynaptic core; and
a duplicate counter maintained within the first neurosynaptic core and synchronized with the counter from the second neurosynaptic core, the first neuron to use a first value from the duplicate counter to adjust the weight of the first synapse coupling the second neuron to the first neuron, wherein to adjust the weight of the first synapse, the first neuron is to compare the first value from the duplicate counter with a second value in a second counter of the first neuron, the second value indicative of spike timing of the first neuron.

12. The system as in claim 11 wherein if the comparison of the first and second values indicates that the first neuron spiked its output after the second neuron spiked its output, then the first neuron is to increase the weight of the first synapse based on a difference between the first and second values.

13. The system as in claim 12 wherein if the comparison of the first and second values indicates that the first neuron spiked its output before the second neuron spiked its output, then the first neuron is to decrease the weight of the first synapse based a difference between the first and second values.

14. The system as in claim 13 wherein increasing or decreasing the weight comprises writing a new weight value to a memory location corresponding to the first synapse.

15. The system as in claim 11 wherein the second neurosynaptic core is to transmit a spike packet to the first neurosynaptic core wherein upon receipt of the spike packet, behavior of the duplicate counter in the first neurosynaptic core and the counter in the second neurosynaptic core is enforced to be identical.

16. The system as in claim 15 further comprising:
a decoder to decode the spike packet to generate results stored within a spike input buffer.

17. The system as in claim 16 wherein outputs from the spike input buffer are communicatively coupled to select one or more rows within the synapse array.

18. The system as in claim 11 wherein each neuron comprises a first circuit to determine whether to spike its output based on weights read from its synapses, the first circuit including an adder to add weights and a comparator to compare the combined weights with a threshold value.

19. The system as in claim 18 further comprising:
a leak circuit to subtract a specified amount from current combined weights on each timestep.

20. The system as in claim 19 further comprising:
a second circuit to perform learning operations to adjust the weight of the first synapses and one or more other synapses.

21. An apparatus comprising:
first spiking means to spike an output of a first neuron of a first neurosynaptic core based on combined weights of synapses over which inputs are received from a plurality of other neurons;
second spiking means to spike an output of a second neuron in a second neurosynaptic core communicatively coupled to the first neuron over a first synapse;
counter duplication means to duplicate a counter maintained within the second neurosynaptic core on the first neurosynaptic core, the duplicated counter synchronized with the counter from the second neurosynaptic core, the first neuron to use a first value from the duplicated counter to adjust the weight of the first synapse coupling the second neuron to the first neuron, wherein to adjust the weight of the first synapse, the first neuron is to compare the first value from the duplicate counter with a second value in a second counter of the first neuron, the second value indicative of spike timing of the first neuron.

22. The apparatus as in claim 21 wherein if the comparison of the first and second values indicates that the first neuron spiked its output after the second neuron spiked its output, then the first neuron is to increase the weight of the first synapse based a difference between the first and second values.

* * * * *